(12) United States Patent
Tao et al.

(10) Patent No.: US 8,750,443 B2
(45) Date of Patent: Jun. 10, 2014

(54) PHASE ERROR ESTIMATOR, COHERENT RECEIVER AND PHASE ERROR ESTIMATING METHOD

(75) Inventors: Zhenning Tao, Beijing (CN); Lei Li, Beijing (CN); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 976 days.

(21) Appl. No.: 12/292,530

(22) Filed: Nov. 20, 2008

(65) Prior Publication Data

US 2009/0141831 A1 Jun. 4, 2009

(30) Foreign Application Priority Data

Nov. 20, 2007 (CN) .......................... 2007 1 0188795

(51) Int. Cl.
*H04L 7/00* (2006.01)
(52) U.S. Cl.
USPC ............ 375/354; 375/371; 375/373; 375/375
(58) Field of Classification Search
USPC .......................... 375/354, 358, 361, 362, 356
See application file for complete search history.

(56) References Cited

U.S. PATENT DOCUMENTS

| 4,397,039 | A | * | 8/1983 | McAuliffe | .................. | 455/202 |
| 5,406,593 | A | * | 4/1995 | Chennakeshu et al. | ........ | 375/376 |
| 6,137,852 | A | * | 10/2000 | McGinn et al. | ............... | 375/375 |
| 6,191,649 | B1 | * | 2/2001 | Sugita et al. | .................. | 329/304 |
| 6,236,263 | B1 | * | 5/2001 | Iwamatsu | ..................... | 329/306 |
| 2004/0161055 | A1 | * | 8/2004 | Sinha | ............................ | 375/322 |

OTHER PUBLICATIONS

English translation of Japanese Office Action mailed Nov. 6, 2012 in corresponding Japanese Application No. 2008-296096.

* cited by examiner

*Primary Examiner* — Qutbuddin Ghulamali
(74) *Attorney, Agent, or Firm* — Staas & Halsey LLP

(57) ABSTRACT

The present invention relates to a phase error estimator, a coherent receiver and a phase error estimating method. The phase error estimator estimates a phase error in an inputted base band electric signal and feeds back said phase error; said phase error estimator comprises: a pre-decider, for judging a phase of data in said base band electric signal in accordance with said feedback phase error; a phase error complex value extracting section, for extracting a real part and an imaginary part of the phase error in accordance with the judgment result of said pre-decider; a phase error determining section, for determining said phase error in accordance with the real part and the imaginary part of the phase error extracted by the phase error complex value extracting section; and a time delay feeding back section, for delaying said phase error by N number of symbols and feeding back the delayed phase error to said pre-decider, wherein N is an integer greater than 1.

15 Claims, 6 Drawing Sheets

PHASE ERROR ESTIMATOR, COHERENT RECEIVER AND PHASE ERROR ESTIMATING METHOD

CROSS-REFERENCE TO RELATED APPLICATIONS

This application is based upon and claims the benefit of priority from prior Chinese Patent Application No. 200710188795.3 filed on Nov. 20, 2007 the entire contents of which are incorporated herein by reference.

BACKGROUND

1. Field

The present invention relates to optical communications, and more particularly, to a coherent receiver.

2. Description of the Related Art

With the gradual enhancement on the requirements of capacity and flexibility of the optical communications system, the coherent optical communication technology has become more and more important. In comparison with incoherent technology (such as on-off key, OOK) or auto coherent technology (such as differential quadrature phase-shift keying, DQPSK), the coherent technology has the following advantages: optical signal-to-noise ratio (OSNR) gain of 3 dB; the capability to make convenient use of equalization technology; and the capability to use more efficient modulation technologies (such as quadrature modulation, QAM). Like the case in electric coherent technology, an optical coherent receiver also requires a device to recover the phase of a carrier. With the development of technologies concerning electronic devices, more and more digital technologies are employed in optical communications to solve problems that are hard to be solved in the optical field of technology. Dany-Sebastien Ly-Gagnon et al. introduce in OFC2005 OTuL4 an optical coherent receiver that makes use of digital signal processing technology. They use forward phase estimation based on digital signal processing to replace the optical phase-locked loop that is practically difficult to realize. FIG. 1 illustrates an optical coherent receiver existed in prior art. As shown in FIG. 1, an optical mixer 102, a local laser oscillator 103, photoelectric detectors 104, 105 and analog-to-digital converters (ADC) 106, 107 make up a front end processing section 118 of the coherent receiver. The front end processing section 118 converts an optical input signal 101 into a base band digital electric signal I+jQ 108 (hereafter referred to also as base band electric signal), where I is a cophase component and Q is a quadrature component. Since there is no phase-locked loop, the base band electric signal 108 contains not only data information but also a phase error between the carrier and local oscillation. A phase error estimator 109 estimates the phase error and outputs an estimated value 113. An argument calculator 110 is used to obtain the argument of a complex input, namely to obtain a phase 111 of the base band electric signal 108, wherein the phase 111 is a summation of the data phase and the phase error. A subtracter 112 subtracts the phase error 113 from the phase 111 to obtain a phase data 119. A data recovering section 114 finally outputs a recovered data value. The phase error estimator 109 consists of a quadruplicater 116, an averager 117, an argument calculator 115 and a divided-by-four section 120 arranged in series to one another. The signal rate can be as high as 40 GHz in a high-speed optical communications system. Such a high-speed signal puts a very high demand on the computational capability of the digital signal processing hardware in the receiver. From another point of view, the computational capability of currently available digital signal processing hardware also restricts the implementation and application of optical digital coherent receivers. The phase error estimator of existing methods contains quadruplicate computation on complex numbers. The complexity of such multiplying computation is considerably higher than addition, subtraction and logical computations.

In view of the foregoing circumstances, there is an urgent need for a simplified phase error estimating method, particularly for one without multiplying computation so as to reduce the demand on the processing capability of the digital signal processing hardware.

SUMMARY

The present invention is proposed in view of the foregoing problems in the state of the art to solve one or more problems existed in prior art.

According to the first aspect of the present invention, there is provided a phase error estimator, for estimating a phase error in an inputted base band electric signal and feeding back said phase error; said phase error estimator comprises: a pre-decider, for judging a phase of data in said base band electric signal in accordance with said feedback phase error; a phase error complex value extracting section, for extracting a real part and an imaginary part of the phase error in accordance with the output of said pre-decider; a phase error determining section, for determining said phase error in accordance with the real part and the imaginary part of the phase error extracted by the phase error complex value extracting section; and a time delay feeding back section, for delaying said phase error by N number of symbols and feeding back the delayed phase error to said pre-decider, wherein N is an integer greater than 1.

According to the second aspect of the present invention, there is provided the phase error estimator according to the first aspect of the present invention, wherein said phase error complex value extracting section extracts the real part w1 and the imaginary part w2 of said phase error in the following manner: when said pre-decider judges the phase of said data to be $\pi/4$, w1=Q−I, w2=I+Q; when said pre-decider judges the phase of said data to be $3\pi/4$, w1=−Q−I, w2=Q−I; when said pre-decider judges the phase of said data to be $5\pi/4$, w1=I−Q, w2=−I−Q; when said pre-decider judges the phase of said data to be $7\pi/4$, w1=Q+I, w2=I−Q; wherein I is a cophase component of said inputted base band electric signal, and Q is a quadrature component of said inputted base band electric signal; said phase error determining section comprises: a first noise removing device, for removing noise in the real part of the phase error as extracted by said phase error complex value extracting section; a second noise removing device, for removing noise in the imaginary part of the phase error as extracted by said phase error complex value extracting section; and an argument calculator, for acquiring an argument in a complex signal formed by the real part having been removed of noise via the first noise removing device and the imaginary part having been removed of noise via the second noise removing device, and determining said argument to be said phase error.

According to the third aspect of the present invention, there is provided the phase error estimator according to the second aspect of the present invention, wherein both of said first noise removing device and said second noise removing device are averagers for arithmetically averaging the N number of symbols.

According to the fourth aspect of the present invention, there is provided the phase error estimator according to the first aspect of the present invention, wherein the pre-decider comprises: a phase error removing section, for removing said feedback phase error from said base band electric signal; and a data phase determining section, for determining a phase of data in said base band electric signal having been removed of said feedback phase error via said phase error removing section.

According to the fifth aspect of the present invention, there is provided the phase error estimator according to the fourth aspect of the present invention, wherein said phase error removing section comprises: an argument calculator, for acquiring an argument of said base band electric signal; and a subtracter, for subtracting said feedback phase error from the argument acquired by said argument calculator; said data phase determining section comprises a $2\pi$ modulo calculator and a quotient calculating and rounding section, wherein said $2\pi$ modulo calculator performs $2\pi$ modulo calculation on said base band electric signal having been removed of said feedback phase error via said phase error removing section, to limit it between 0 and $2\pi$; and said quotient calculating and rounding section divides said base band electric signal, which have been limited between 0 and $2\pi$ via said $2\pi$ modulo calculator, by a predetermined value, and acquires an integral portion of the quotient.

According to the sixth aspect of the present invention, there is provided the phase error estimator according to the fifth aspect of the present invention, wherein said predetermined value is $\pi/2$ or $2\pi/5$.

According to the seventh aspect of the present invention, there is provided the phase error estimator according to the fourth aspect of the present invention, wherein said phase error removing section comprises: an argument calculator, for acquiring an argument of said base band electric signal; and a subtracter, for subtracting said feedback phase error from the argument acquired by said argument calculator; said data phase determining section comprises: a $2\pi$ modulo calculator, for performing $2\pi$ modulo calculation on said base band electric signal having been removed of said feedback phase error via said phase error removing section, to limit it between 0 and $2\pi$; a first deciding section, for comparing an output of said $2\pi$ modulo calculator with a first threshold value; a subtracting section, for subtracting said first threshold value from the output of said $2\pi$ modulo calculator when the output of said $2\pi$ modulo calculator is greater than said first threshold value; a second deciding section, for comparing an output of said subtracting section with a second threshold value; and a table looking-up and determining section, for determining a phase of data in said base band electric signal by looking up a table and in accordance with the outputs of said first deciding section and said second deciding section.

According to the eighth aspect of the present invention, there is provided the phase error estimator according to the fourth aspect of the present invention, wherein said phase error removing section is a complex multiplying section, for rotating, toward a direction opposite said phase error, said base band electric signal to a size equaling said phase error; said data phase determining section comprises: a real part calculator, for acquiring a real part of a complex output of said complex multiplying section; a first determinator, for determining the sign of the real part acquired via said real part calculator; an imaginary part calculator, for acquiring an imaginary part of the complex output of said complex multiplying section; a second determinator, for determining the sign of the imaginary part acquired via said imaginary part calculator; and a table looking-up and determining section, for determining a phase of data in said base band electric signal by looking up a table and in accordance with the outputs of said first determinator and said second determinator.

According to the ninth aspect of the present invention, there is provided a coherent receiver, which is characterized in comprising the phase error estimator according to any of aspects 1-8 of the present invention.

According to the tenth aspect of the present invention, there is provided a phase error estimating method, for estimating a phase error in a base band electric signal and feeding back said phase error; said phase error estimating method comprises: a pre-judging step, for judging a phase of data in said base band electric signal in accordance with said feedback phase error; a phase error complex value extracting step, for extracting a real part and an imaginary part of the phase error in accordance with the judgment result of said pre-judging step; a phase error determining step, for determining said phase error in accordance with the real part and the imaginary part of the phase error extracted in the phase error complex value extracting step; and a time delay feeding back step, for delaying said phase error by N number of symbols and feeding back the delayed phase error for application in said pre-judging step, wherein N is an integer greater than 1.

According to another aspect of the present invention, there is provided a coherent receiver, which comprises a front end processing section, the phase error estimator according to any of aspects 5 to 7 of the present invention, a receiver subtracting section, and a data recovering section; wherein the receiver subtracting section subtracts the phase error determined by the phase error determining section from the output of the argument calculator in the pre-decider of the phase error estimator, and outputs the subtraction result to the data recovering section.

According to yet another aspect of the present invention, there is provided a computer program, which enables, when executed by a computer or a logical device, the computer or the logical device to realize the phase error estimator according to any of aspects 1 to 8 of the present invention or the phase error estimating method according to the tenth aspect of the present invention.

The present invention further provides a computer storage medium for storing the computer program.

BRIEF DESCRIPTION OF THE DRAWINGS

The aforementioned and other characteristics and advantages of the present invention will become more apparent in the detailed description below with reference to the accompanying drawings, in which.

DETAILED DESCRIPTION OF EMBODIMENTS

Specific embodiments of the present invention are described in greater detail below with reference to the accompanying drawings. These descriptions are exemplary and explanatory in nature, rather than restrictive to the protection scope of the present invention.

Figure 1:
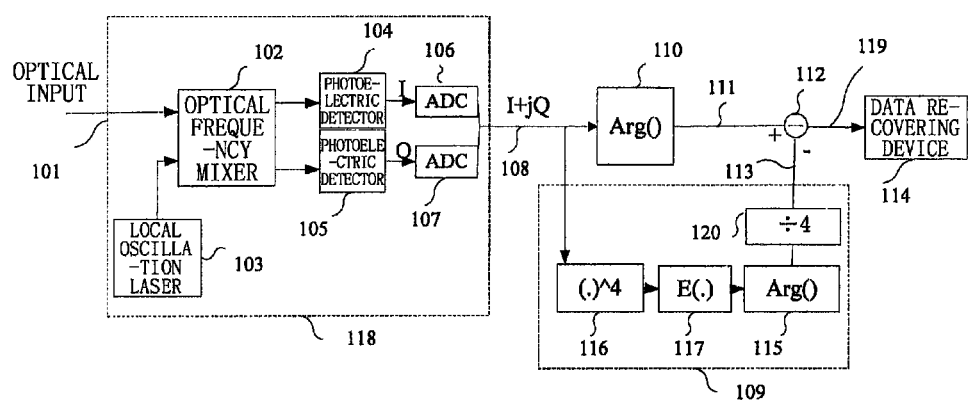
FIG. 1 illustrates an optical coherent receiver of the prior art.
Figure 2:
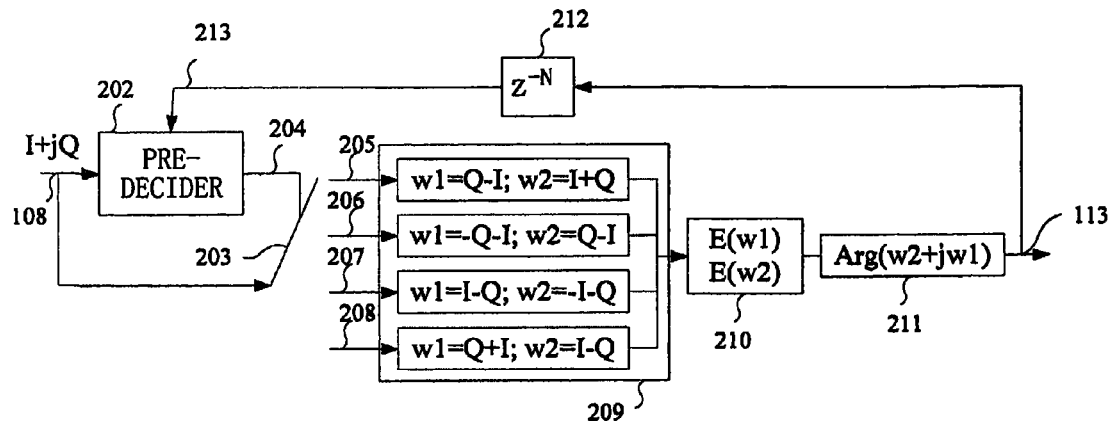
FIG. 2 illustrates a phase error estimator according to an embodiment of the present invention.

FIG. 2 illustrates the structure of the phase error estimator according to the present invention. The input of the phase error estimator is a base band electric signal 108, namely I+jQ=exp(j$\theta_d$+j$\theta$), that is outputted from the front end processing section 118 (see FIG. 1) of the coherent receiver. In general cases, the base band electric signal 108 contains not only data information $\theta_d$, but also a phase error $\theta$ between the carrier and local oscillation. The function of the phase error estimator according to the present invention rests in the estimation of this phase error $\theta$. The following description takes the QPSK modulation mode, namely $\theta_d \in \pi/4, 3\pi/4, 5\pi/4, 7\pi/4$, as example.

The base band electric signal 108 is firstly inputted to the pre-decider 202. The pre-decider 202 performs a general judgment of the transmitted information in accordance with the current base band electric signal 108 and a phase error 213 before N (N is an integer greater than 1) symbols ahead, and outputs a pre-decided value 204 (namely a signal indicative of the preliminarily estimated data phase) as a switch control signal to control a select switch 203. Since the phase error used is before N number of symbols, such judgment can only be a general one, and the value thereof is also referred to as pre-decided value. The Initial phase error can be set as 0 during initial judgment. The pre-decided value can be 0, 1, 2 or 3, which are respectively represented as $\theta_d=\pi/4, 3\pi/4, 5\pi/4, 7\pi/4$. In accordance with the switch control signal 204, the select switch 203 connects the base band electric signal 108 to the input ports 205, 206, 207 or 208 of the phase error complex value extracting section 209. The phase error complex value extracting section 209 obtains a real part w2 and an imaginary part w1 of a phase error $\sqrt{2} \exp(j\theta)$ represented as a complex number. The principle is described below.

When data information $\theta_d=\pi/4$, the output 204 of the pre-decider is 0, and the select switch 203 connects the base band electric signal 108 (namely I+jQ=exp(j$\theta_d$+j$\theta$)) to the input port 205. Calculate w1=Q−I; w2=I+Q in the phase error complex value extracting section 209, namely $$w_1=\sin(\pi/4+\theta)-\cos(\pi/4+\theta); w_2=\sin(\pi/4+\theta)+\cos(\pi/4+\theta), \text{i.e.}$$

$$w_1=\sqrt{2}/2(\cos(\theta)+\sin(\theta)-\cos(\theta)+\sin(\theta))=\sqrt{2}\sin(\theta)$$

$$w_2=\sqrt{2}/2(\cos(\theta)+\sin(\theta)+\cos(\theta)-\sin(\theta))=\sqrt{2}\cos(\theta)$$

When the data phase is any other value, the following can also be obtained with the algorithm shown in FIG. 2 and with similar analysis:

$$w_1=\sqrt{2}\sin(\theta); w_2=\sqrt{2}\cos(\theta)$$

The noise removing device then removes the noise from the estimated imaginary part and real part. The noise removing device can be realized, for instance, by an averager 210. The averager 210 is a simple device that performs arithmetic averaging on the N number of symbols, and is capable of removing noise. The argument calculator 211 obtains the argument $\theta$ of the averaged complex number $w_2+jw_1= \sqrt{2}(\cos(\theta)+j\sin(\theta))=\sqrt{2}\exp(j\theta)$, and outputs the same as phase error 113. Phase error 113 is outputted as the output of the phase error estimator, and meanwhile is sent to the pre-decider 202 for next time usage after having been time-delayed by N number of symbols by a time delay device 212.

The pre-decider 202 and the control select switch 203 are separately realized in the above description, but they can also be integrated together. Moreover, the control select switch 203 can also be integrated with the phase error complex value extracting section 209. The pre-decider 202, the control select switch 203, the phase error complex value extracting section 209, the averager 210 and the argument calculator 211 can all be realized by such digital devices having smart programming capabilities as MCUs, CPUs, and programmable logical devices, etc.

Figure 3A:
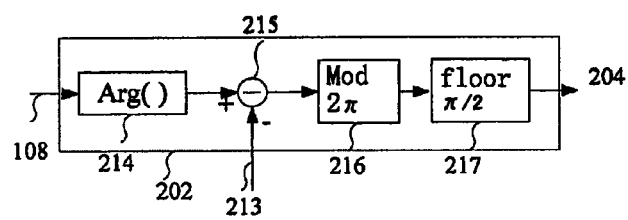
FIG. 3 illustrates the structure of a pre-decider according to the present invention.

Specific embodiments of the pre-decider are described below. FIG. 3 illustrates several embodiments of the pre-decider. The pre-decider 202 as shown in FIG. 3A includes an argument calculator 214, a subtracter 215, a Mod $2\pi$ calculator 216 ($2\pi$ modulo calculator) and a floor $\pi/2$ calculator 217. The argument calculator 214 obtains the argument of the base band electric signal 108, namely $\theta_d+\theta$, the subtracter 215 subtracts from this argument the phase error 213 $\theta''$ before N number of symbols (as previously mentioned, $\theta''=0$ can be set during initial operation). $\theta \approx \theta''$ in the case the phase error gradually varies, and the output of the subtracter 215 is substantially the phase data $\theta_d$. The argument calculator 214 and the subtracter 215 correspond to the phase error removing section of the present invention.

The Mod $2\pi$ calculator 216 performs $2\pi$ modulo operation on the output of the subtracter 215 to restrict it between 0 and $2\pi$, and outputs the restricted data phase. The floor $\pi/2$ calculator 217 firstly divides this data phase by $\pi/2$ (as should be noted, $\pi/2$ is only exemplary in this context, as it is easier for realization, but other values, such as $2\pi/5$, can also be used, as long as the switch control signal can be obtained after rounding), and the integral part of the quotient is obtained and outputted to obtain the switch control signal 204. Thus, when $\theta_d=\pi/4, 3\pi/4, 5\pi/4, 7\pi/4$, output 204 of the pre-decider is respectively 0, 1, 2 or 3, as consistent with what is previously mentioned.

Figure 3B:
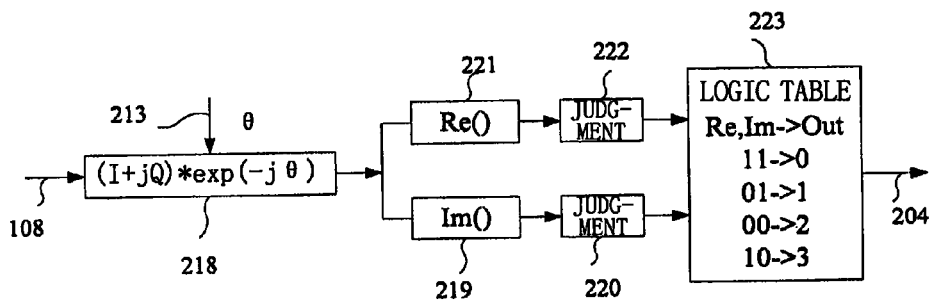

The pre-decider 202 as shown in FIG. 3B includes a complex multiplying section 218, a real part obtainer 221, an imaginary part obtainer 219, determinators 222, 220 and a logic conversion table 223. The complex multiplying section 218 multiplies the complex base band electric signal 108 (namely I+jQ=exp(j$\theta_d$+j$\theta$)) with exp(−j$\theta$) to obtain a signal having been removed of phase error (namely exp(j$\theta_d$)=cos($\theta_d$)+j sin($\theta_d$)), where $\theta$ is another input of the complex multiplying section 218, i.e. constellation rotation angle (namely also a phase error obtained through feedback). The complex multiplying section 218 corresponds to the phase error removing section of the present invention. The imaginary part obtainer 219 obtains the imaginary part of the output of the complex multiplying section 218; when the imaginary part is greater than or equal to 0, the determinator 220 outputs logic 1, while logic 0 is outputted when the imaginary part is less than 0. The real part obtainer 221 and the determinator 222 are respectively similar in structure to the imaginary part obtainer 219 and the determinator 220. The real part obtainer 221 obtains the real part of the output signal of the complex multiplying section 218; when the real part is greater than or equal to 0, the determinator 222 outputs logic 1, while logic 0 is outputted when the real part is less than 0. The logic conversion table 223 converts the logical values outputted by the determinators 222, 220 into the switch control signal 204. When the logical values outputted by the determinators 222, 220 are 1, 1, the logic conversion table 223 outputs 0; when the logical values outputted by the determinators 222, 220 are 0, 1, the logic conversion table 223 outputs 1; when the logical values outputted by the determinators 222, 220 are 0, 0, the logic conversion table 223 outputs 2; and when the logical values outputted by the determinators 222, 220 are 1, 0, the logic conversion table 223 outputs 3.

Figure 3C:
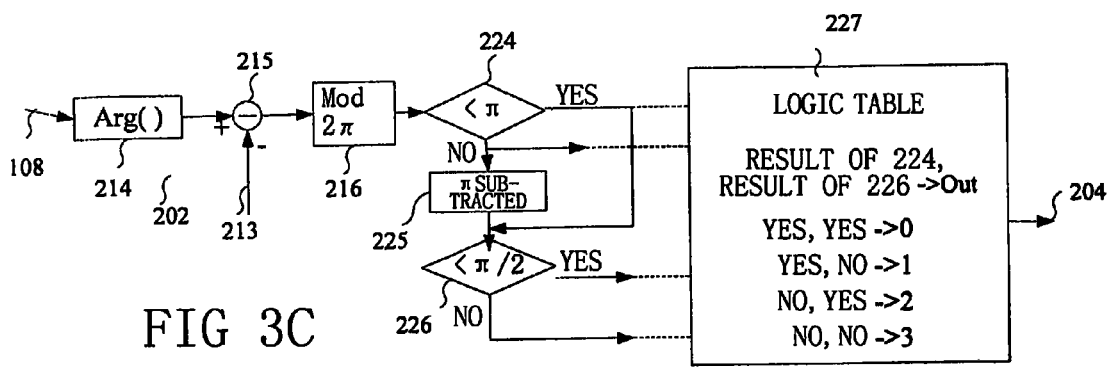

The pre-decider 202 as shown in FIG. 3C includes an argument calculator 214, a subtracter 215, a Mod 2π calculator 216, a first determining section 224, a subtracter 225, a second determining section 226 and a table looking-up section 227. The first determining section 224 determines whether the output of the Mod 2π calculator 216 (namely the restricted data phase) is less than π. If it is less than π, then entered into the second determining section 226; if it is not less than π, entered into the second determining section 226 after π has been subtracted in device 225. The second determining section 226 determines whether its input is less than π/2, and outputs the determined value. The table looking-up section 227 outputs the switch control signal 204 in accordance with the determination results of the determining sections 224, 226. The conversion relationship is as shown in the figure for instance. As should be noted here, both the π/2 and π are merely exemplary in this context rather than restrictive to the present invention.

Figure 3D:
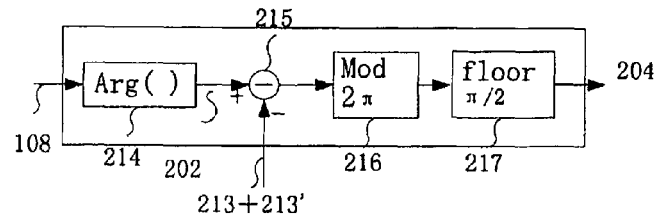
Figure 3E:
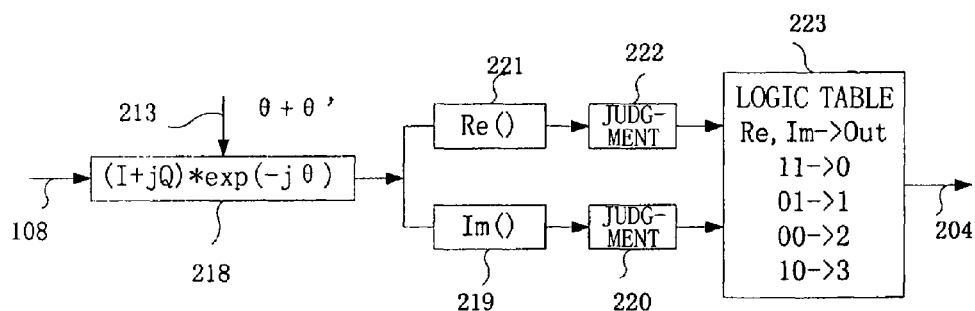
Figure 3F:
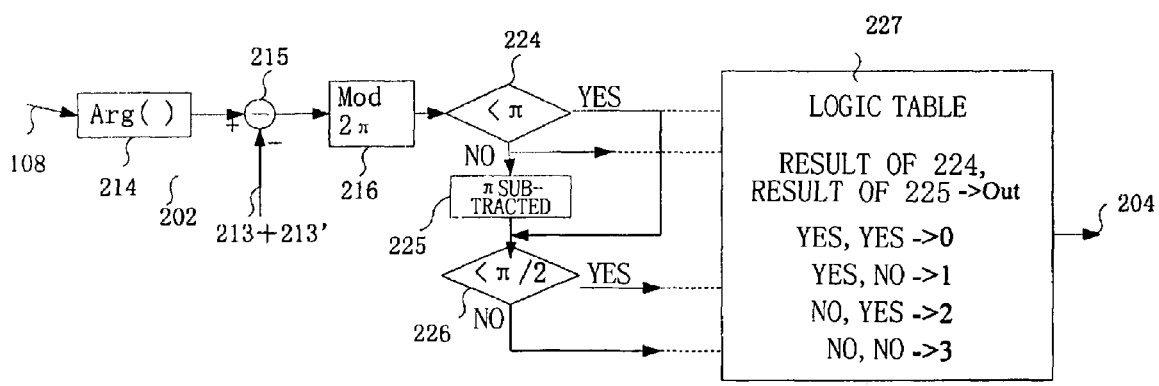

Additionally, when the coherent receiver or the phase error estimator includes a frequency offset estimating device, it is also possible for the pre-deciders as shown in FIGS. 3A and 3C to each include a second subtracter or a second complex multiplier, which is used for removing phase offset caused by frequency offset inputted from the frequency offset estimating device of the coherent receiver. The frequency offset estimating device can, for instance, be the device proposed by C. R. S Fludge et al. in 2006 (IEEE photonics Technology Letters, Volume:19, Issue: 6, Page 366-368). Of course, the second subtracter or the second complex multiplier can be the same one as the subtracter or the complex multiplying section shown in FIGS. 3A-3C. In other words, as shown in FIGS. 3D-3F, it is possible to also input the phase caused by the frequency offset as estimated by the frequency offset estimating device and the feedback phase into the subtracter or complex multiplying section shown in FIGS. 3A-3C. In FIGS. 3D-3F, 213' and θ' are frequency offsets estimated by a frequency offset estimating device. Under such a circumstance, a subtracter can be added in the phase error estimator upstream of the time delay device 212 to subtract phase error changes of the N number of symbols caused by the frequency offset estimated by the frequency offset estimating device.

Addition, subtraction or logic operations are mainly performed in the phase error estimator according to the present invention, thereby greatly simplifying computational complexity and achieving the principal objective of the present invention. Even if the complex multiplier is used in the pre-decider, this is much simpler than prior art technical solutions.

Moreover, the phase error estimator according to the present invention is capable of processing phase errors between 0 and 2π, that is to say, the output 113 of the argument calculator 211 ranges from 0 to 2π, thus avoiding the problem of 90° ambiguities; whereas the known method as shown in FIG. 1 can only estimate from 0 to π/2 due to the presence of the divided-by-four section.

Figure 4:
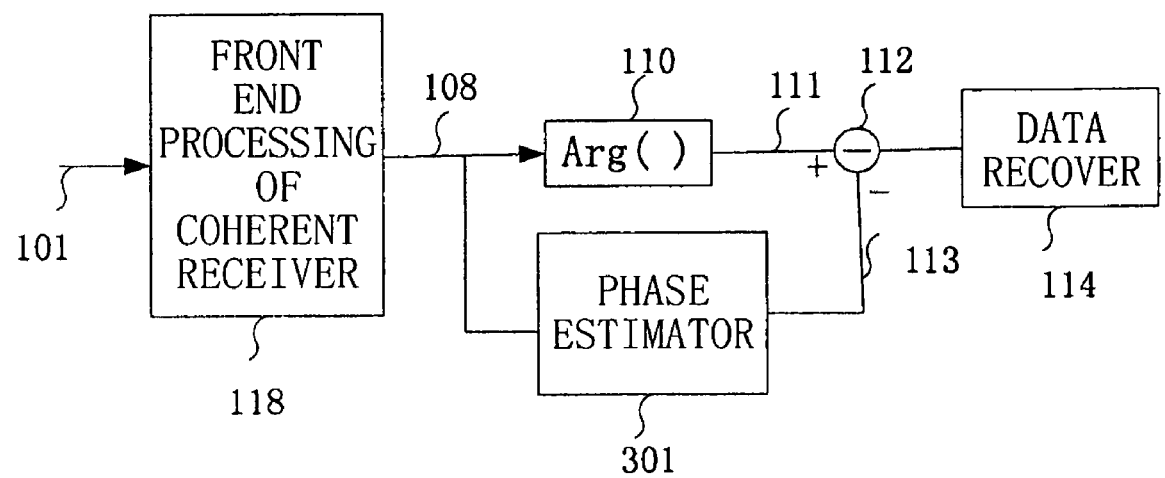
FIG. 4 illustrates an embodiment of an optical coherent receiver which incorporates the phase error estimator according to the present invention.

FIG. 4 illustrates an optical coherent receiver that makes use of the phase error estimator according to the present invention. Its structure differs not much from the structure as shown in FIG. 1, except that the phase error estimator 301 according to the present invention replaces the conventional estimator 109.

Figure 5:
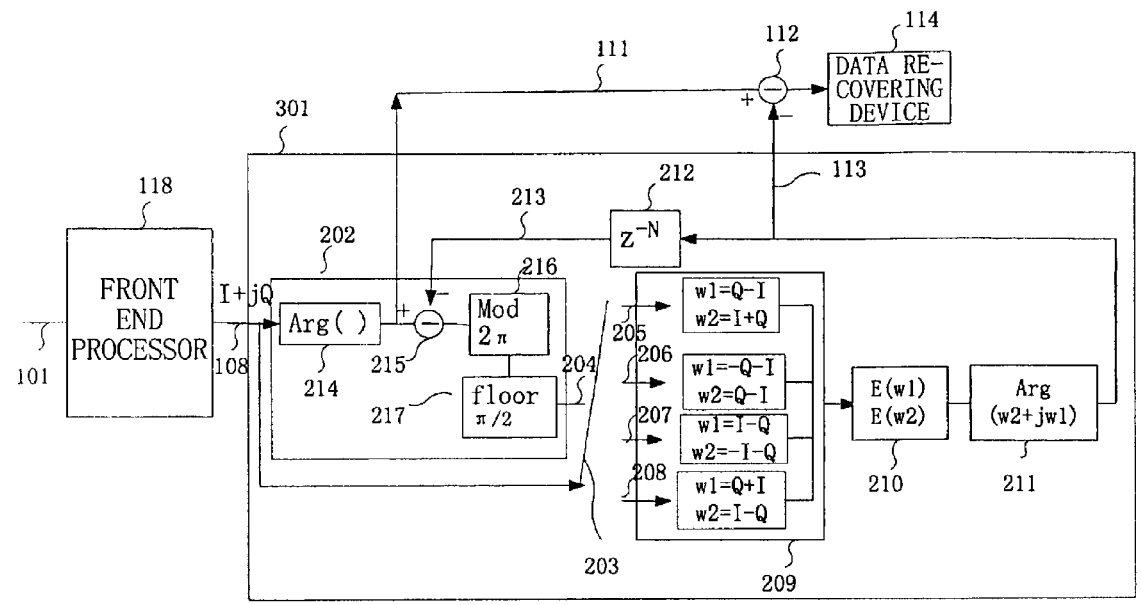
FIG. 5 illustrates another embodiment of the optical coherent receiver which incorporates the phase error estimator according to the present invention.

FIG. 5 illustrates another optical coherent receiver that makes use of the phase error estimator according to the present invention. In comparison with the structure as shown in FIG. 3, the argument calculator 110 in FIG. 3 and the argument calculator 214 in the pre-decider 202 of the phase error estimator 301 are combined into one argument calculator 214, and besides this, nothing differs.

Figure 6:
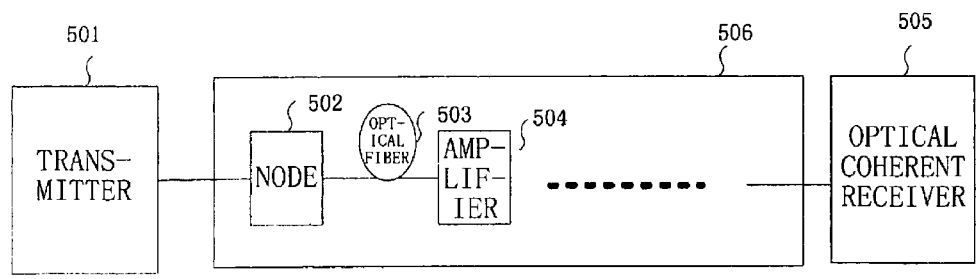
FIG. 6 illustrates an optical communications system which makes use of the coherent receiver according to the present invention.

FIG. 6 illustrates an optical communications system that makes use of the optical coherent receiver according to the present invention. The system comprises a transmitter 501, an optical fiber link 506 and a receiver 505. The optical fiber link 506 may include one or more nodes 502, an optical fiber 503 and a magnifier 504. Except for the optical coherent receiver 505 according to the present invention, each of the aforementioned parts is made up by publicly known technologies, such as the transmitter technology published by R. A. Griffin et al. OFC 2002, in "Optical Differential Quadrature Phase-Shift Key (oDQPSK) for High Capacity Optical Transmission".

Figure 7:
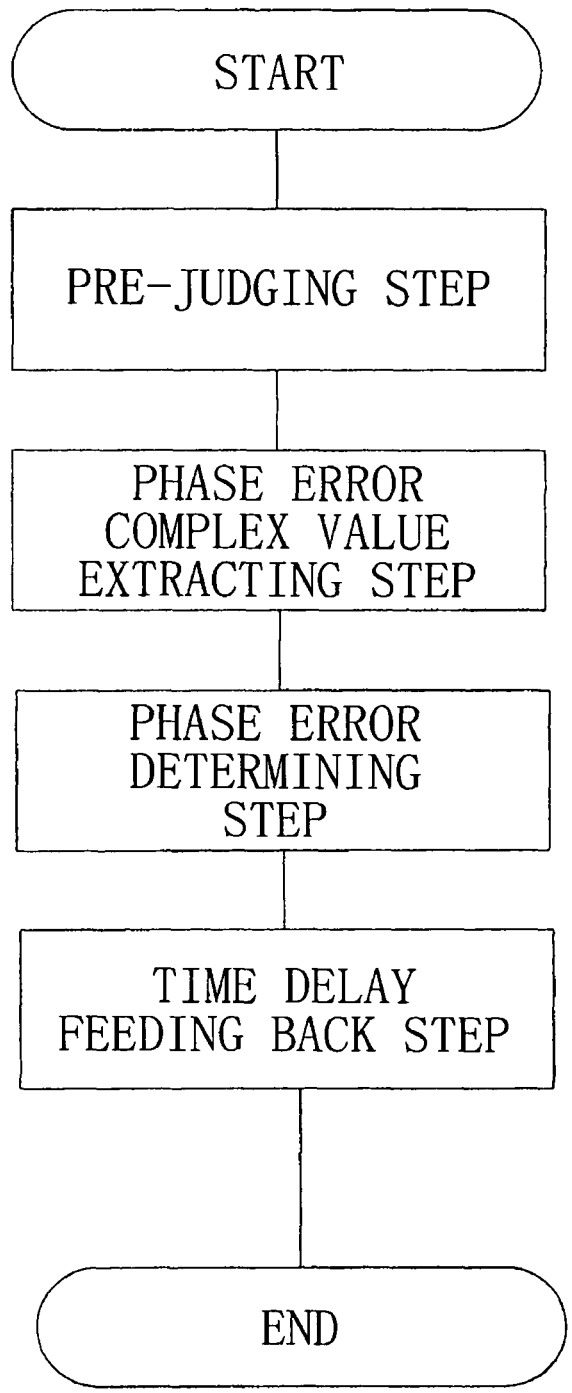
FIG. 7 is a flowchart illustrating the phase error estimating method according to the present invention.

FIG. 7 illustrates an embodiment of the phase error estimating method according to the present invention. As shown in FIG. 7, the phase error estimating method according to the present invention comprises: a pre-judging step, for judging a phase of data in a base band electric signal in accordance with a feedback phase error; a phase error complex value extracting step, for extracting a real part and an imaginary part of the phase error in accordance with the output of said prejudging step; a phase error determining step, for determining said phase error in accordance with the real part and the imaginary part of the phase error extracted in the phase error complex value extracting step; and a time delay feeding back step, for delaying said phase error by N number of symbols and feeding back the delayed phase error for application in said pre-judging step, wherein N is an integer greater than 1.

The pre-judging step can for instance be realized by the pre-deciders shown in FIGS. 3A-3F. The phase error complex value extracting step can for instance be calculated to complete by the phase error complex value extracting section 209 by using the formula shown in FIG. 2. The phase error determining step can for instance be realized by the averager 210 and the argument calculator 211 shown in FIG. 2. The time delay feeding back step can for instance be realized by the time delay device 212 shown in FIG. 2.

The aforementioned devices of the present invention can also be realized by computer software, which enables a computer to execute the functions of the aforementioned devices, or enables the computer to perform the steps in the aforementioned method. The computer can for instance be a general computer including a CPU, an ROM, an input/output means, a hard disk, an RAM etc., or a dedicated computer. The computer program can be a single computer program, and can also be a suite of programs consisting of a plurality of computer programs.

The computer program or suite of computer programs can be stored on a computer-readable storage medium. The computer-readable storage medium can for instance be such various media as a CD, a DVD, a floppy disk, a flash memory, a magnetic tape etc. that are known to persons skilled in the art.

As should be aware by persons skilled in the art, it is possible to make various modifications and variations to the present invention on practical demand. All these modifications and variations are covered by the present invention as long as they fall within the scope of the claims as attached.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A phase error estimator, for estimating a phase error in an inputted base band electric signal and feeding back said phase error; said phase error estimator comprising:

a pre-decider, for judging a phase of data in said base band electric signal in accordance with said feedback phase error;

a phase error complex value extracting section, for extracting a real part and an imaginary part of the phase error in accordance with the judgment result of said pre-decider;

a phase error determining section, for determining said phase error in accordance with the real part and the imaginary part of the phase error extracted by the phase error complex value extracting section; and a time delay feeding back section, for delaying said phase error by N number of symbols and feeding back the delayed phase error to said pre-decider, wherein N is an integer greater than 1, wherein said phase error complex value extracting section extracts the real part w2 and the imaginary part w1 of said phase error in the following manner:

when said pre-decider judges the phase of said data to be $\pi/4$, w1=Q−I, w2=I+Q;

when said pre-decider judges the phase of said data to be $3\pi/4$, w1=Q−I, w2=Q−I;

when said pre-decider judges the phase of said data to be $5\pi/4$, w1=I−Q, w2=−I−Q;

when said pre-decider judges the phase of said data to be $7\pi/4$, w1=Q+I, w2=I−Q;

wherein I is a cophase component of said inputted base band electric signal, and Q is a quadrature component of said inputted base band electric signal;

said phase error determining section comprises:

a first noise removing device, for removing noise in the real part of the phase error as extracted by said phase error complex value extracting section;

a second noise removing device, for removing noise in the imaginary part of the phase error as extracted by said phase error complex value extracting section; and an argument calculator, for acquiring an argument in a complex signal formed by the real part having been removed of noise via the first noise removing device and the imaginary part having been removed of noise via the second noise removing device, and determining said argument to be said phase error.

2. The phase error estimator according to claim 1, wherein both of said first noise removing device and said second noise removing device are averagers for arithmetically averaging the N number of symbols.

3. A coherent receiver, comprising the phase error estimator according to claim 2.

4. The phase error estimator according to claim 1, wherein the pre-decider comprises:

a phase error removing section, for removing said feedback phase error from said base band electric signal; and a data phase determining section, for determining a phase of data in said base band electric signal having been removed of said feedback phase error via said phase error removing section.

5. A coherent receiver, comprising the phase error estimator according to claim 1.

6. A phase error estimator, for estimating a phase error in an inputted base band electric signal and feeding back said phase error; said phase error estimator comprising:

a pre-decider, for judging a phase of data in said base band electric signal in accordance with said feedback phase error;

a phase error complex value extracting section, for extracting a real part and an imaginary part of the phase error in accordance with the judgment result of said pre-decider;

a phase error determining section, for determining said phase error in accordance with the real part and the imaginary part of the phase error extracted by the phase error complex value extracting section; and a time delay feeding back section, for delaying said phase error by N number of symbols and feeding back the delayed phase error to said pre-decider, wherein N is an integer greater than 1, wherein the pre-decider comprises:

a phase error removing section, for removing said feedback phase error from said base band electric signal; and a data phase determining section, for determining a phase of data in said base band electric signal having been removed of said feedback phase error via said phase error removing section, wherein said phase error removing section comprises:

an argument calculator, for acquiring an argument of said base band electric signal; and a subtracter, for subtracting said feedback phase error from the argument acquired by said argument calculator;

said data phase determining section comprises a $2\pi$ modulo calculator and a quotient calculating and rounding section, wherein said $2\pi$ modulo calculator performs $2\pi$ modulo calculation on said base band electric signal having been removed of said feedback phase error via said phase error removing section, to limit it between 0 and $2\pi$; and said quotient calculating and rounding section divides said base band electric signal, which have been limited between 0 and $2\pi$ via said $2\pi$ modulo calculator, by a predetermined value, and acquires an integral portion of the quotient.

7. The phase error estimator according to claim 6, wherein that said predetermined value is $\pi/2$ or $2\pi/5$.

8. A coherent receiver, comprising the phase error estimator according to claim 7.

9. A coherent receiver, comprising the phase error estimator according to claim 6.

10. A phase error estimator, for estimating a phase error in an inputted base band electric signal and feeding back said phase error; said phase error estimator, comprising:

a pre-decider, for judging a phase of data in said base band electric signal in accordance with said feedback phase error;

a phase error complex value extracting section, for extracting a real part and an imaginary part of the phase error in accordance with the judgment result of said pre-decider;

a phase error determining section, for determining said phase error in accordance with the real part and the imaginary part of the phase error extracted by the phase error complex value extracting section; and a time delay feeding back section, for delaying said phase error by N number of symbols and feeding back the delayed phase error to said pre-decider, wherein N is an integer greater than 1, wherein the pre-decider comprises:

a phase error removing section, for removing said feedback phase error from said base band electric signal; and a data phase determining section, for determining a phase of data in said base band electric signal having been removed of said feedback phase error via said phase error removing section, wherein said phase error removing section comprises:

an argument calculator, for acquiring an argument of said base band electric signal; and a subtracter, for subtracting said feedback phase error from the argument acquired by said argument calculator;
said data phase determining section comprises:
a 2 π modulo calculator, for performing 2 π modulo calculation on said base band electric signal having been removed of said feedback phase error via said phase error removing section, to limit it between 0 and 2 π ;
a first deciding section, for comparing an output of said 2 π modulo calculator with a first threshold value;
a subtracting section, for subtracting said first threshold value from the output of said 2 πmodulo calculator when the output of said 2 π modulo calculator is greater than said first threshold value;
a second deciding section, for comparing an output of said subtracting section with a second threshold value; and
a table looking-up and determining section, for determining a phase of data in said base band electric signal by looking up a table and in accordance with the outputs of said first deciding section and said second deciding section.

11. A coherent receiver, comprising the phase error estimator according to claim 10.

12. A phase error estimator, for estimating a phase error in an inputted base band electric signal and feeding back said phase error; said phase error estimator comprising:
a pre-decider, for judging a phase of data in said base band electric signal in accordance with said feedback phase error;
a phase error complex value extracting section, for extracting a real part and an imaginary part of the phase error in accordance with the judgment result of said pre-decider;
a phase error determining section, for determining said phase error in accordance with the real part and the imaginary part of the phase error extracted by the phase error complex value extracting section; and
a time delay feeding back section, for delaying said phase error by N number of symbols and feeding back the delayed phase error to said pre-decider,
wherein N is an integer greater than 1,
wherein the pre-decider comprises:
a phase error removing section, for removing said feedback phase error from said base band electric signal; and
a data phase determining section, for determining a phase of data in said base band electric signal having been removed of said feedback phase error via said phase error removing section,
wherein said phase error removing section is a complex multiplying section, for rotating, toward a direction opposite said phase error, said base band electric signal to a size equaling said phase error;
said data phase determining section comprises:
a real part calculator, for acquiring a real part of a complex output of said complex multiplying section;
a first determinator, for determining the sign of the real part acquired via said real part calculator;
an imaginary part calculator, for acquiring an imaginary part of the complex output of said complex multiplying section;
a second determinator, for determining the sign of the imaginary part acquired via said imaginary part calculator; and
a table looking-up and determining section, for determining a phase of data in said base band electric signal by looking up a table and in accordance with the outputs of said first determinator and said second determinator.

13. A coherent receiver, comprising the phase error estimator according to claim 12.

14. A phase error estimating method, for estimating a phase error in a base band electric signal and feeding back said phase error; said phase error estimating method comprising:
a pre-judging step, for judging a phase of data in said base band electric signal in accordance with said feedback phase error;
a phase error complex value extracting step, for calculating a real part and an imaginary part of the phase error in accordance with the judgment result of said pre-judging step;
a phase error determining step, for determining said phase, error in accordance with the real part and the imaginary part of the phase error extracted in the phase error complex value extracting step; and
a time delay feeding back step, for delaying said phase error by N number of symbols and feeding back the delayed phase error for application in said pre-judging step, wherein N is an integer greater than 1,
wherein said phase error complex value extracting step calculating the real part w2 and the imaginary part w1 of the phase error in the following manner:
when said phase of said data judged by the pre-judging step to be π/4, w1=Q−I, w2=I+Q;
when said phase of said data judged by the pre-judging step 3π/4, w1=Q−I, w2=Q−I;
when said phase of said data judged by the pre-judging step 5π/4, w1=I−Q, w2=−I−Q;
when said phase of said data judged by the pre-judging step 7π/4, w1=Q+I, w2=I−Q;
wherein I is a cophase component of said inputted base band electric signal, and Q is a quadrature component of said inputted base band electric signal;
said phase error determining step comprises:
a first noise removing step, for removing noise in the real part of the phase error as calculated by said phase error complex value extracting step;
a second noise removing step, for removing noise in the imaginary part of the phase error as calculated by said phase error complex value extracting step; and
an argument calculating step, for acquiring an argument in a complex signal formed by the real part having been removed of noise by the first noise removing step and the imaginary part having been removed of noise by the second noise removing step, and determining said argument to be said phase error.

15. A coherent receiver, comprising a phase error estimator for estimating a phase error in an inputted base band electric signal and feeding back said phase error, said phase error estimator comprising:
a pre-decider, for judging a phase of data in said base band electric signal in accordance with said feedback phase error;
a phase error complex value extracting section, for extracting a real part and an imaginary part of the phase error in accordance with the judgment result of said pre-decider;
a phase error determining section, for determining said phase error in accordance with the real part and the imaginary part of the phase error extracted by the phase error complex value extracting section; and
a time delay feeding back section, for delaying said phase error by N number of symbols and feeding back the delayed phase error to said pre-decider, wherein N is an integer greater than 1,
wherein the pre-decider comprises:
a phase error removing section, for removing said feedback phase error from said base band electric signal; and a data phase determining section, for determining a phase of data in said base band electric signal having been removed of said feedback phase error via said phase error removing section.

\* \* \* \* \*